United States Patent Office 2,766,287
Patented Oct. 9, 1956

2,766,287

PRODUCTION OF NITROGENOUS ALDEHYDE CONDENSATION PRODUCTS

Walter Rottig, Oberhausen-Sterkrade-Nord, Germany, assignor to Ruhrchemie Aktiengesellschaft, Oberhausen-Holten, Germany, a corporation of Germany No Drawing. Application October 25, 1950,
Serial No. 192,143

Claims priority, application Germany October 31, 1949

4 Claims. (Cl. 260—578)

This invention relates to improvements in the production of nitrogeneous aldehyde condensation products.

It is possible, as is well known to easily convert aldehydes into Oxoaldehydes of double the original molecular size by means of a so-called aldol condensation. By then splitting off water, unsaturated aldehydes are obtained which can easily be polymerized to higher products. The best known example of this is acetaldehyde ($CH_3CHO$), which, by bimolecular rearrangement gives oxy-butyraldehyde ($CH_3CHOHCH_2CHO$) from which crotonaldehyde ($CH_3CH=CHCHO$) is obtained by splitting off water. Such aldol condensations are generally effected with potassium hydroxide, sodium hydroxide or other inorganic alkalis. However, organic condensation agents such as, for example piperidin, or salts from organic bases and organic acids, for example, piperidinacetate can also be used.

It has been found that aldehydes and aldehyde mixtures can be converted into novel nitrogen-containing condensation products if they are condensed with ammonia or ammonium salts of organic acids in the presence of an excess of ammonia. This reaction in accordance with the invention takes place simultaneously with the aldol condensation and can easily be made the principal reaction by the application of suitable condensation conditions. The resultant condensation products consist chiefly of hydro-aromatic compounds containing amino groups. They are produced from the aldols formed as intermediate compounds and partially directly from the original aldehydes. Moreover there are formed aliphatic aldol condensation products free from nitrogen.

The condensation in accordance with the invention can be effected with aliphatic aldehydes containing from 1 to 20 carbon atoms per molecule. It can be effected with particular ease with aldehydes containing more than two carbon atoms per molecule. It is possible, however, to obtain condensation products in accordance with the invention when using acetaldehyde as starting material. The conversion of acetaldehyde into the desired condensation products presents, however, certain difficulties as it is necessary to work under pressure. Finally also aliphatic and aromatic aldehydes having aldehyde groups in the side-chain may be used. The aldehydes are expediently condensed with excessive ammonia. The use of from two to five mols ammonia per one mol aldehyde has proved to be expedient. The excessive ammonia is continually recirculated.

The aldehyde mixture to be condensed in the presence of excess ammonia is preferably diluted with solvents which form azeotropic binary or ternary mixtures with the water split off during the reaction or with water and aldehydes. Aldehydes having up to eight carbon atoms per molecule form ternary mixtures with the solvents and the water, whereas aldehydes having more than eight carbon atoms per molecule do not take part in the formation of the azeotropic mixtures. In this case the solvent forms a binary mixture with only the water. In this manner, the water which is split off can continuously be removed from the reaction mixture and the condensation of the aldehydes may be carried to completion by continuously upsetting the equilibrium. Suitable solvents are for example aliphatic, aromatic or naphthenic hydrocarbons or their mixtures boiling in the range of approximately 30° C. to approximately 160° C., such as hexane and hetane fractions.

A sufficiently strong current of gaseous ammonia is continuously passed at elevated temperature through the solvent diluted aldehyde mixture. Under these conditions, the oxyaldehyde which first forms due to aldol condensation, continuously splits off water which forms a ternary mixture with hydrocarbons and unreacted aldehydes. At the same time, a reaction with ammonia takes place.

The azeotropically distilled distillates are condensed and liquefied by a reflux condenser. They separate in the receiver into two layers, the upper layer comprising a mixture of hydrocarbons and aldehydes while the lower layer contains aldehyde-containing water. The lower layer can easily be freed of its aldehyde content by treatment with an excess of hydrocarbon. The simplest procedure for this purpose is to cause the aqueous layer to flow through a sufficiently high layer of the hydrocarbons used for the dilution and separating the same thereafter by way of overflow. The water remaining after the removal of the aldehyde still contains the unreacted ammonia and which may be recovered by distillation to be used again for the reaction.

The conversion of aldehydes in accordance with the invention, with an excess of ammonia, is preferably carried out at normal atmospheric pressure. However, increased or reduced pressure can also be used. The reaction temperatures are between approximately 20 and 150° C. and preferably between 40 and 100° C. and naturally are strongly dependent on the boiling points of the aldehydes which are to be converted.

Example 1

A mixture of 120 cc, propionaldehyde and 120 cc. of a hydrogenated $C_6$ hydrocarbon fraction of a boiling point of 65 to 68° C. was heated to a slight boil. Gaseous ammonia was conducted through the mixture at the rate of 2 liters of ammonia per hour. The mixture of aldehyde, hydrocarbon and water which distills off was condensed and conducted through a column of the same $C_6$ hydrocarbon fraction in order to recover the non-reacted aldehyde. This fraction was thereupon returned to the reaction vessel. The reaction was continued until about 24 cc. of water had passed over. The distillation gave about 25% methyl-ethyl-acrolein, about 30% nitrogen-containing condensation products and a resin which could be used for various purposes, for example for molding compounds and the manufacture of varnishes. The yield of nitrogen-containing condensation products may be increased to more than 50% when carrying out the reaction until 35 cc. of water have passed over. In this case the condensation products consist of trimethyl and trimethyl dihydro-aniline.

Example 2

Ammonia was passed at a velocity of about 1.5 liters per hour through a slightly boiling mixture consisting of 120 cc. butyraldehyde and 120 cc. of a hydrogenated $C_6$ hydrocarbon fraction of a boiling point of 65 to 68° C. The ternary mixture which distilled off consisted of aldehyde, hydrocarbon and water. It was condensed in a cooler and conducted through a suitable hydrocarbon fraction in order to recover the aldehyde. This fraction was thereupon returned to the reaction vessel. Heating was continued until a total of 25 cc. of water had passed over.

The subsequent distillation gave in addition to small quantities of unreacted butyraldehyde, nitrogen-containing fractions having a boiling point of about 260°, 280° and 320° C. In addition to this, a resin-like condensation product remained which was suitable for various purposes, for example, for molding compounds, the manufacture of varnishes and impregnation.

*Example 3*

Ammonia was passed at a rate of about 2 liters per hour through a slightly boiling mixture of 150 cc. of butyraldehyde diluted with 150 cc. of water. The ternary mixture of aldehyde, benzene and water which distills off was condensed and washed out in a column of benzene in order to recover the aldehyde. This benzene was also returned to the reaction vessel. The reaction was continued until a total of 37 cc. of water had passed over. The subsequent distillation gave in addition to small quantities of unreacted butyraldehydes and small quantities of $C_8$ and $C_{12}$ aldehyde, nitrogen-containing fractions of the hydro-aromatic amino compound type having boiling points of 260, 280 and 320° C. In addition to this, a resin-like nitrogen-containing condensation product was formed in a larger quantity which may be used for the purposes mentioned in Example 2.

*Example 4*

A mixture of 160 cc. $C_{11}$ aldehyde gained by subjecting an olefine-containing $C_{10}$ hydrocarbon fraction to the Oxo process and which was dissolved in 120 cc. of a $C_8$ fraction was heated to a slight boil. Ammonia was conducted through the mixture at a rate of 2 liters per hour. The reaction was completed when 10 cc. of water had been formed. Working-up gave in addition to larger quantities of resin-like nitrogen-containing condensation products, several derivatives of the type of partially hydrogenated nitrogen compounds.

I claim:

1. Method for the production of nitrogen-containing aldehyde condensation products which comprises effecting a catalyst free contacting of at least one unsubstituted alkyl aldehyde having between 3 and 11 carbon atoms with ammonia at a temperature of about 40° to 100° C. in the presence of a low boiling hydrocarbon solvent capable of forming an azeotropic mixture with water which will boil at said temperature, substantially continuously removing the water of reaction by distillation as an azeotropically boiling mixture with said solvent, and recovering the condensation products formed.

2. Method according to claim 1, in which the water is separated from said azeotropically boiling mixture removed by distillation and in which said water is intimately contacted with a solvent for aldehyde dissolved therein, said aldehyde being recovered from the solvent solution.

3. Method according to claim 1, in which said contacting is effected at normal pressure.

4. Method according to claim 1, in which said contacting is effected with an excess of ammonia.

References Cited in the file of this patent

UNITED STATES PATENTS

| | | |
|---|---|---|
| 1,456,702 | Matheson | May 29, 1923 |
| 2,058,435 | Fischer | Oct. 27, 1936 |
| 2,293,619 | Novotny | Aug. 18, 1942 |
| 2,443,420 | Gresham | July 15, 1948 |
| 2,523,580 | Mahan | Sept. 26, 1950 |
| 2,542,315 | Eickmeyer | Feb. 20, 1951 |
| 2,615,022 | Mahan | Oct. 21, 1952 |

FOREIGN PATENTS

| | | |
|---|---|---|
| 521,891 | France | 1921 |
| 534,494 | Great Britain | 1941 |

OTHER REFERENCES

Frank: JACS, pp. 1368–69, vol. 68, July 1946.

Ser. No. 387,106, Stitz (A. P. C.), published July 13, 1943.